(12) United States Patent
McCrory

(10) Patent No.: US 6,318,746 B1
(45) Date of Patent: Nov. 20, 2001

(54) CONNECTOR SYSTEM FOR COUPLING A TRAILER SUSPENSION FRAME

(75) Inventor: Kevin Richard McCrory, Chilliwack (CA)

(73) Assignee: Ty-Crop Manufacturing Ltd., Chilliwack (CA)

( * ) Notice: Subject to any disclaimer, the term of this patent is extended or adjusted under 35 U.S.C. 154(b) by 0 days.

(21) Appl. No.: 09/467,067

(22) Filed: Dec. 20, 1999

(30) Foreign Application Priority Data

Jul. 3, 1999 (CA) ................................................ 22719153

(51) Int. Cl.[7] ............................................. B62D 53/00
(52) U.S. Cl. ................................. 280/411.1; 280/514
(58) Field of Search ..................... 280/408, 411.1, 280/514, 476.1

(56) References Cited

U.S. PATENT DOCUMENTS

| | | |
|---|---|---|
| 3,246,912 * | 4/1966 | Cunha . |
| 3,312,479 | 4/1967 | Cunha . |
| 3,476,405 * | 11/1969 | Cunha . |
| 3,764,164 | 10/1973 | Lankenau . |
| 3,827,723 | 8/1974 | Neff et al. . |
| 3,836,178 | 9/1974 | Ham . |
| 4,162,082 * | 7/1979 | Curry . |
| 4,262,920 | 4/1981 | Mettetal . |
| 4,400,004 | 8/1983 | Arguin . |
| 4,600,210 | 7/1986 | McMurray . |
| 4,740,007 | 4/1988 | Lutz et al. . |
| 4,768,802 * | 9/1988 | Winkler . |
| 4,955,629 | 9/1990 | Todd et al. . |
| 5,630,603 | 5/1997 | Turner et al. . |
| 5,860,668 | 1/1999 | Hull et al. . |

* cited by examiner

Primary Examiner—Kevin Hurley
(74) Attorney, Agent, or Firm—Miles & Stockbridge P.C.; John C. Kerins

(57) ABSTRACT

A connector system for coupling a suspension frame device to the rear part of a transport trailer for use in distributing the weight of the load of the trailer to extra wheels and/or providing an effective attachment arrangement for connecting a second trailer behind the first trailer in tandem fashion. The connector system includes a part formed at the front of the suspension frame device which includes a rigid frame portion carried by an additional set or sets of wheels, and the connector system further includes a second part formed integrally at the rear of the frame of the first trailer, the two parts having mating guiding portions for properly aligning the suspension frame device with the trailer as the parts come to an initial hitching position. One of the parts includes a draw bar and the other of the parts includes a connection for attaching to the draw bar in the initial hitching position and pulling the suspension frame device relative to the trailer into a final hitching position whereat the parts are interlocked together. When in the interlocked condition, the engagement between the two parts is such that the frame of the trailer and that of the suspension frame device function as a continuous beam of the first trailer and provide a fifth wheel connection for the second trailer.

25 Claims, 9 Drawing Sheets

CONNECTOR SYSTEM FOR COUPLING A TRAILER SUSPENSION FRAME

FIELD OF INVENTION

This invention relates to a trailer suspension frame, and more particularly, to a connector system for detachably connecting a suspension frame device to a rear end of a suspension frame of a road transporting trailer.

BACKGROUND OF INVENTION

Various systems have been developed for adjusting the positioning of an axle carried frame portion of a transport trailer of the type commonly used with a towing vehicle, such as a road tractor. There are also in use dolly devices which are towed by a first trailer and support the front end of a second trailer pulled in tandem in relation to the first trailer. Also certain of the above mentioned systems, which are adapted to adjust the position of the axle carried frame portion under a front trailer, are constructed so that the axle carried frame portion can be positioned for connection of a second trailer behind the front trailer.

Of prime importance, of course, in tractor-trailer operation, is that the entire rig, whether it is adapted to tow a second trailer, commonly called a "pup", or not, be entirely safe at highway speeds. Also of importance is that the trailer can be easily and quickly transformed from one mode to another by the driver of the tractor and that the maneuverability and general road performance is not significantly affected by such transformation.

Whether, the front trailer towed directly by the tractor has an auxiliary frame portion located to the rear of the normal frame portion of the trailer for the purpose of load distribution to the road or for the purpose of providing a connection to a second trailer, it is necessary, if the first trailer is of a type for unloading from the rear, that the auxiliary frame portion be readily detachable and again connectable from the first trailer to allow dumping of other types of unloading from the rear of the first trailer. Generally the connector systems of known types function in a manner which does not allow ready connection or disconnection or are not of a type which provide a connection of sufficient rigidity to allow the frame of the first trailer and that of an auxiliary frame to function as one continuous suspension frame.

SUMMARY OF THE INVENTION

It is an object of the present invention to provide a connector system which allows ready coupling and detachment of a suspension frame device to a rear part of a suspension frame of a transport trailer in a manner that when attachment is complete, the suspension frame device and suspension frame of the transport trailer function as a continuous suspension beam for weight distribution between the wheels of the trailer and additional wheels of the suspension frame device.

It is also an object of one form of the present invention to provide a connector system which facilitates the complete and sure locking of the suspension frame device to the rear part of the suspension frame of a transport trailer.

The present invention relates to a connector system for coupling a suspension frame device to a rear part of a suspension frame of a transport trailer which has longitudinally extending frame members, the suspension frame device including a rigid main frame portion and wheel means supporting the frame portion for road travel when attached behind the transport trailer. The suspension frame device has a forwardly located first connector means attached thereto, and a second connector means is carried by the rear part of the suspension frame of the transport trailer for connection with the first connector means.

According to one aspect of the present invention, the first connector means includes first lock means carried by the frame portion of the suspension frame device and a second connector means which includes second lock means carried by the frame members of the transport trailer with the second lock means being positioned to form an interlock with the first lock means when the first and second connector means are moved to a final lock position in relation to each other. The first and second lock means include selectively actuable means for engaging and disengaging the interlock of said first and second lock means for preventing longitudinal departure of said frame portion of said suspension frame device from said rear part of said suspension frame of said transport trailer. The first connector means further includes forwardly exposed engagement surface means located above the first lock means, and the second connector means further includes rearwardly exposed engagement surface means located above said second lock means and disposed for contact with said forwardly exposed engagement surface means of the first connector means upon the interlock of the first and second lock means. In the interlocked condition, compression bending moments are transferred through engagement of the rearwardly and forwardly exposed engagement surface means and tension bending moments are transferred through the interlock of the first and second lock means so that the combination of the interlocked frame portion of the suspension frame device and the suspension frame of the transport trailer functions as a continuous beam.

It is apparent from the above that in the attached condition, the continuous beam effect achieves weight distribution to the road surface through a greater number of wheels and yet allows for disconnection of the suspension frame device when not required, such as to permit load dumping when the trailer is of the rear dump type.

According to another aspect of the present invention, a first guidance means is fastened to the suspension frame device and is associated with the first connector means. A second guidance means is associated with and is fastened to the rear part of the suspension frame of the transport trailer and is located to interact with the first guidance means of the suspension frame device during movement of the transport trailer relative to the suspension frame device towards a hitching position of the first and second connector means. The first and second guidance means are adapted to interact to position the first and second connector means in a preliminary hitching condition. Locating means is affixed to one of the first and second connector means and includes actuator means for pulling the other of the first and second connector means from the preliminary hitching condition to locate the first connector means in a final hitching position relative to the second connector means. There is the first lock means carried by the frame portion of the suspension frame device, and the second lock means is carried by the frame members of the transport trailer, the second lock means being positioned for interlock with the first lock means as said first connector means is moved to the final hitching position. Thus, the frame portion of the suspension frame is rigidly connected to the frame members of the transport trailer by the interlocking of the first and second lock means.

The provision of the above described guidance means in combination with the locating means for establishing a preliminary hitch condition followed by movement to a final hitching position whereat a complete interlock is achieved which not only facilitates the connection of the suspension frame device to the suspension frame of the transport trailer, but ensures a positive locking condition necessary for highway travel.

BRIEF DESCRIPTION OF DRAWINGS

In the accompanying drawings which show one embodiment of the invention as an example.

DETAILED DESCRIPTION OF A PREFERRED EMBODIMENT OF THE INVENTION

Figure 1:
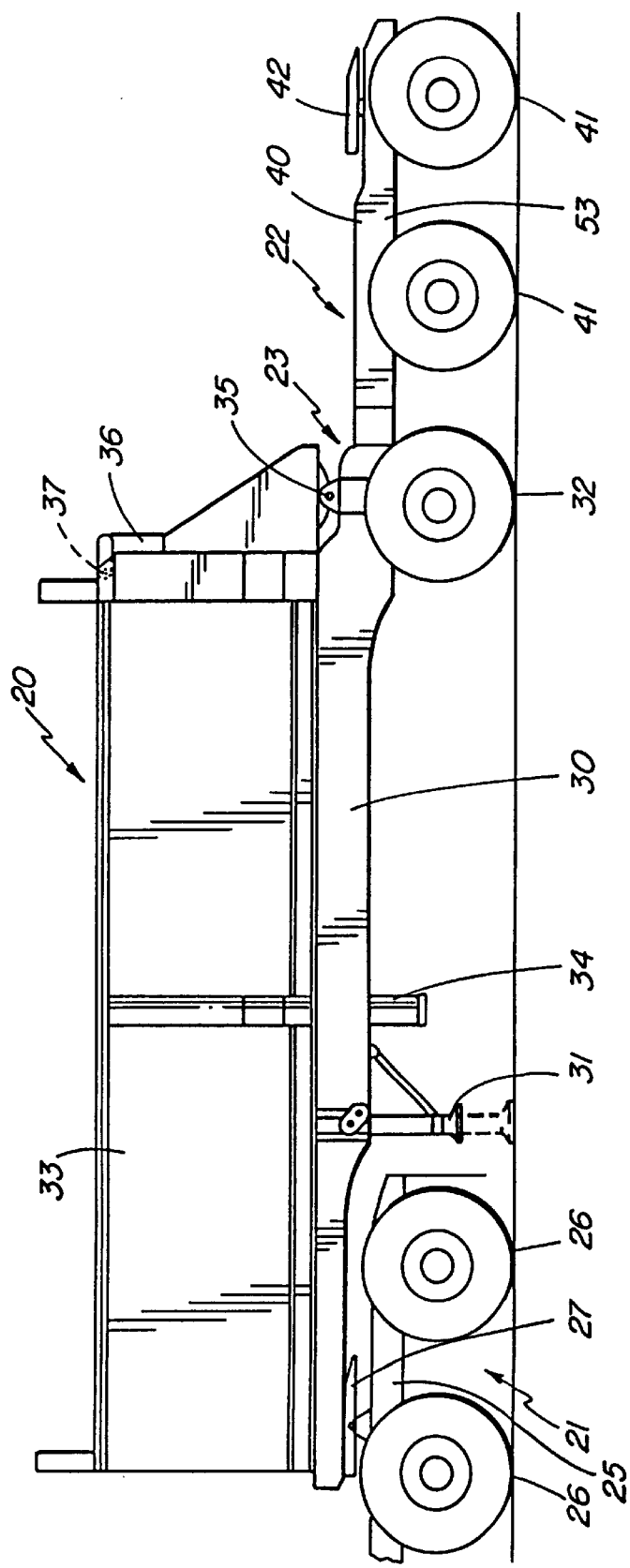
FIG. 1 is a side elevation view of a first trailer to the rear of which is attached a suspension frame device by way of a connector system of the present invention.

Like reference characters to those utilized in the following description are used to denote the same components in the drawings. The reference character 20 generally denotes in FIG. 1 a first or front transport trailer mounted for tow by a conventional tractor unit, only the rear portion of which is shown by the reference character 21. There is shown attached to the rear of the first trailer 20 a suspension frame device 22 by way of a connector system of the present invention generally shown at 23. In FIG. 2, there is shown a second trailer 24 mounted at the front thereof on the suspension frame device 22 which is disconnected from the first or front trailer 20 shown in FIG. 1. As will become apparent from the following description, when the suspension frame device 22 is connected to the front trailer 20 and has the second trailer 24 mounted in the fashion shown in FIG. 2, the second trailer 24 is pulled in tandem, or pup fashion, behind the first trailer 20 as it is towed by the tractor unit.

A frame member 25 at the rear of the tractor unit is mounted on two pair of rear wheels 26, and it has a conventional fifth wheel 27 mounted thereon for receiving a pin (not shown) affixed to and projecting downwardly from a front part of a main frame 30 of trailer 20. A retractable support jack system 31 is provided beneath the main frame 30 for supporting the front portion of the trailer 20 when it is not mounted on the fifth wheel of a tractor unit. A rear end of the main frame 30 of the trailer 20 is carried on a pair of rear wheels 32. The illustrated trailer 20 is of the dump type having a box 33 mounted on the frame 30 and adapted to be raised by a lift cylinder 34 so as to pivot about an axis 35 at the rear end of main frame 30. The rear end of the box 33 is normally closed by a rear gate 36 which can swing about an upper horizontal pivot connection 37 so as to open and allow the contents to dump from the rear of the trailer as the box is raised to a dump position.

Figure 2:
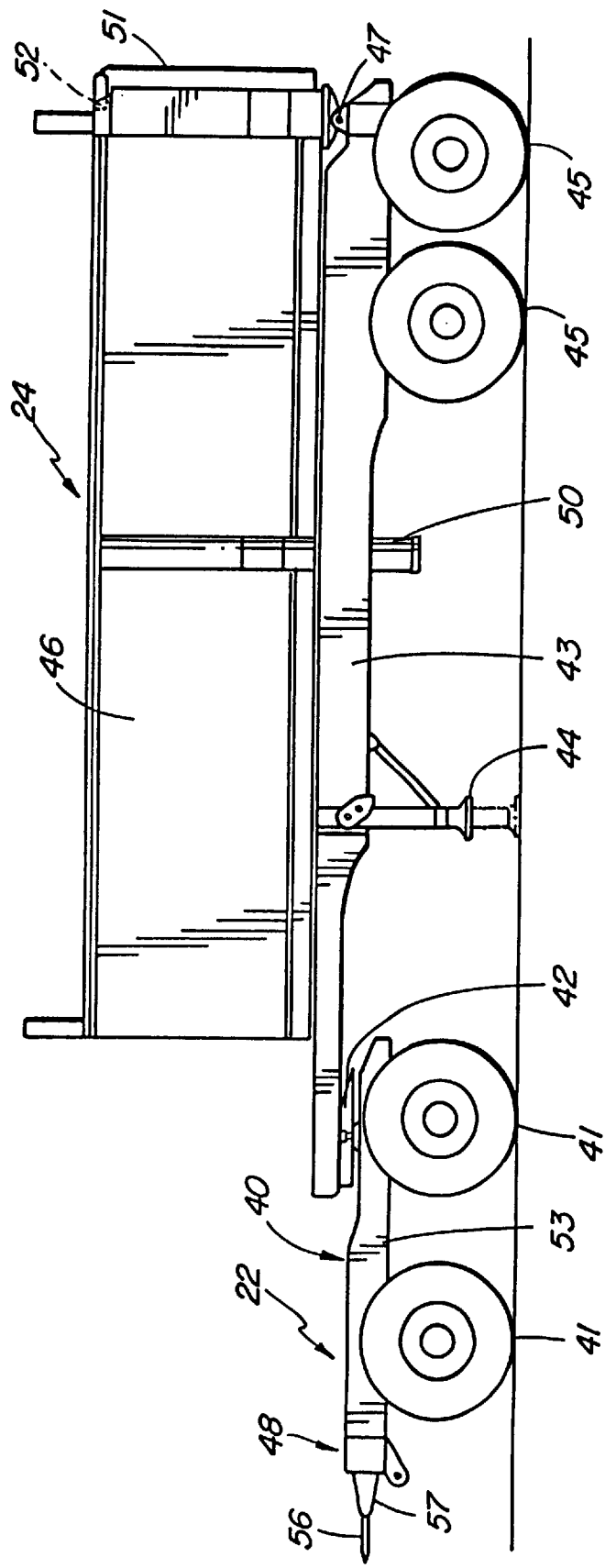
FIG. 2 is a side view of a second trailer having the forward end thereof mounted on the suspension frame device shown in FIG. 1 but wherein the suspension frame device is disconnected from the first trailer.

As may be seen in FIGS. 1 and 2 suspension frame device 22 includes a rigid main frame 40 carried on wheel means shown as two pairs of wheels 41,41. Mounted on the frame 40 of the suspension frame device 22 is a fifth wheel 42 adapted to receive a downwardly projecting pin (not shown) affixed beneath a front part of a main frame 43 of the second trailer 24 (FIG. 2). The second trailer 24 also has a support jack device 44. The rear of the trailer 24 is supported on two pairs of wheels 45,45 and like the first trailer 20, it is of the dump type having a box 46 mounted to pivot at the rear about a horizontal axis 47, when raised by a lift cylinder 50 to a dump position. The rear of box 46 is normally closed by a tail gate 51 which can swing outwardly about an upper horizontal pivot connection 52.

Figure 3:
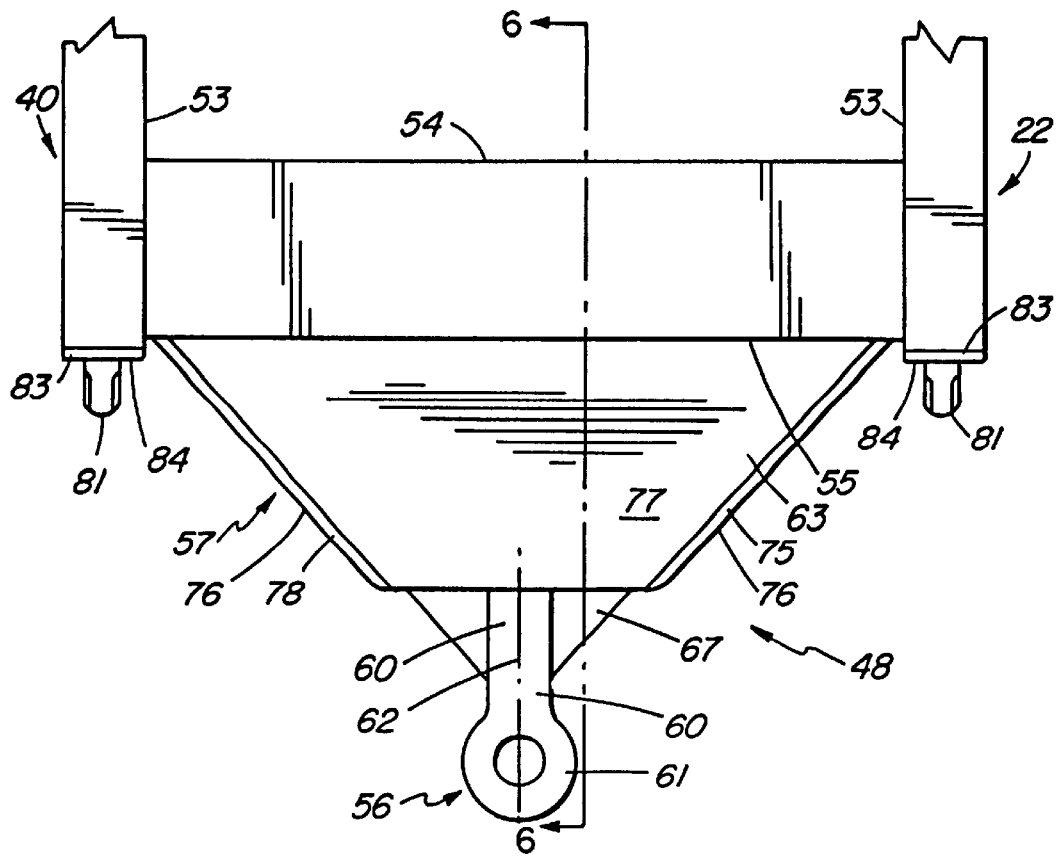
FIG. 3 is an enlarged plan view of a portion of the connector system of the present invention located at the front of the suspension frame device shown in FIGS. 1 and 2.
Figure 4:
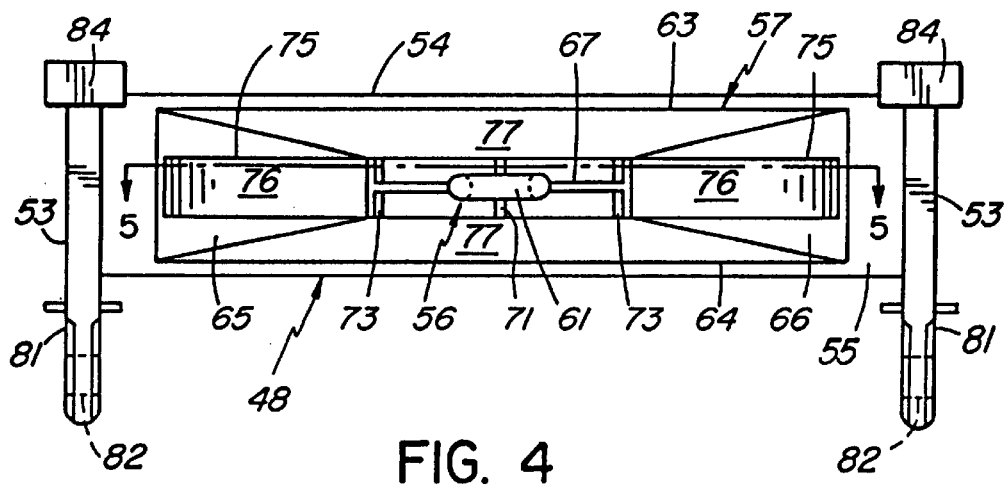
FIG. 4 is a front view of the portion of the connector system of the present invention as shown in FIG. 3.

The frame 40 of the suspension frame device 22 includes a pair of lateral spaced side frame members 53,53 which extend in the longitudinal direction and are joined adjacent front ends thereof by a transverse box member 54 having a front vertical face 55 spanning the space between the side frame members 53,53. Projecting forwardly from the front of the suspension frame device 22 is one part 48 of the connector system 23 of the present invention, the part 48 including a first connector means 56 and a guidance means 57. The connector means 56, as shown is in the form of a draw bar 60 of the type having an eye-hook 61 at its forward end, the draw bar 60 having its longitudinal axis 62 extending on a centerline of the frame 40 of the suspension frame device 22 (FIG. 3). The guidance means 57 is a forwardly tapered member including top plate member 63, a bottom plate member 64, and two side plate members 65 and 66. Each of the four plate members are secured, such as by welding, at its rear edge to the front face 55 of the transverse box member 54. The top and bottom plate members converge in a forward direction as do side plate members to thus form a frustum, which, in the illustrated embodiment is a frusto pyramidal shaped forward projection concentric with the central longitudinal axis 62. Located midway between the top and bottom plate members 63 and 64 is a horizontally disposed web plate 67 which is affixed to the front face 55 along its rear edge, such as by welding, and along its front converging edges to the inside converging surfaces of side plate members 64 and 65. The web plate 67 has a slot 70 extending rearwardly from the front thereof shaped to receive a rear portion 72 of the draw bar 60. The draw bar is secured to the web plate 67, again, such as by welding. A pair of reinforcing vertical flange means 73, which are spaced a distance substantially equal to the front opening between the forward edges of side plate members 65 and 66, extend in the longitudinal direction and have top and bottom edges tapered so as to be affixed between the bottom surface of the upper plate member 63 and the web plate 67 and between the top surface of the bottom plate member 64 and the web plate 67. A like shaped reinforcing central vertical flange 71 is also affixed to the front face 55 of the box member 54, to the inside surfaces of the upper and bottom plate members 63 and 64, and to the web plate 67. The central vertical flange 71 is also provided with a slot 74 (FIG. 6) extending rearwardly from its front edge so as to receive the rear portion 72 of the draw bar 60. Along the lengths of the outside converging surfaces provided by side plates 65 and 66 of the guidance means 57 there are affixed heavy wear plates 75,75, which provide the contacting surfaces 76,76 accommodating lateral guidance, whereas top and bottom contacting surfaces 77,77 formed by the upper and bottom plate members 64 and 65 accommodate the vertical guidance as the front of the suspension frame device is brought toward a hitching condition with the part 49 of the connector system 23 at the rear of the first trailer, as will be described in more detail.

Figure 6:
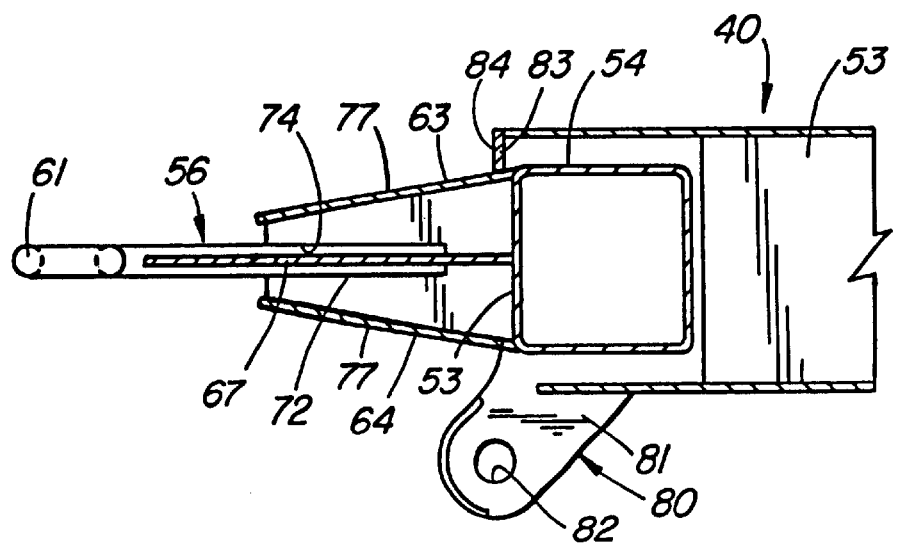
FIG. 6 is a cross section view of the portion of the connector system as seen from line 6—6 of FIG. 3.
Figure 5:
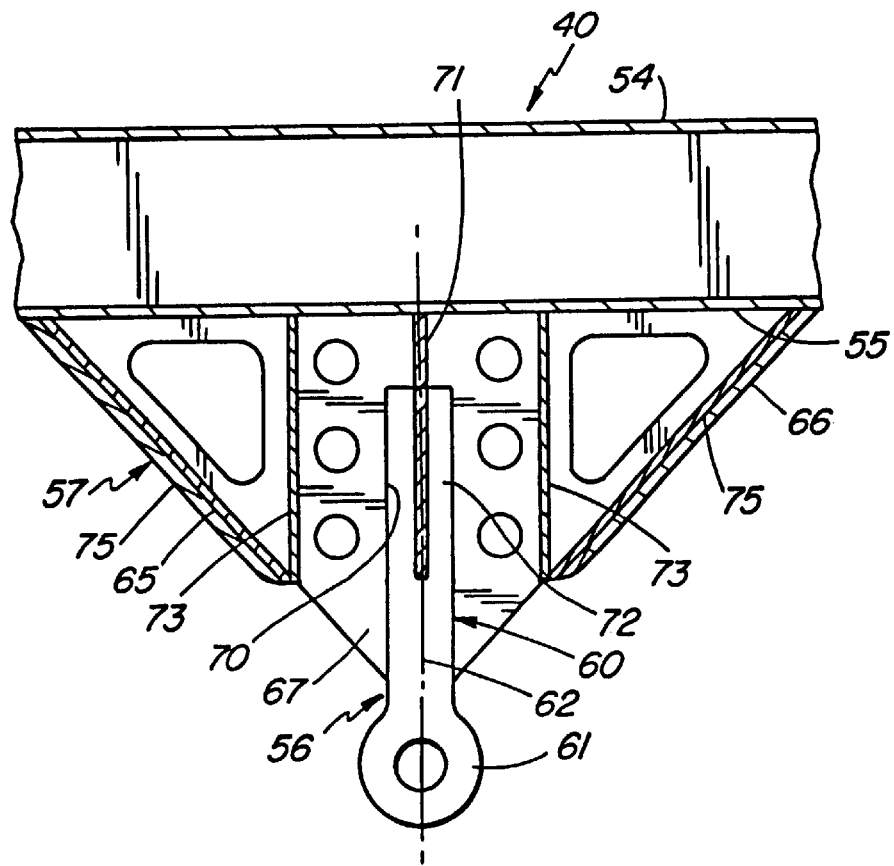
FIG. 5 is a cross section view of the portion of the connector system as seen from the line 5—5 of FIG. 4.

As may be observed particularly from FIGS. 3, 5 and 6, the forward or eye hook portion 61 of the draw bar, which is fixed rigidly relative to the guidance means 57, projects well forward of the forward portion of the guidance means 57. While in the embodiment shown, the frusto pyramidal shaped projection forming the first guidance means 57 is substantially enclosed by the upper and bottom plate members 64 and 65 and the side plate members 65 and 66, except for the forward opening, in that the plate members are affixed, such as by welding, along their common edges, it may be desirable to provide a plurality of openings through the plate members so as to prevent an accumulation of sand or like material which could be detrimental during engagement of the guidance means during the connecting operation.

The part 48 of the connector means located at the front of the frame suspension device 22 further includes first lock means 80 which is provided by a pair of heavy lugs 81 affixed to the front of side frame members 53,53 of the frame portion 40 of the suspension frame device 22. As shown, each lug 81 is affixed to the front ends of the side frame members 53,53, and projects forwardly and downwardly therefrom, and these lugs are provided with aligned transverse openings 82. Located at the upper part of each side frame member 53,53 is a transverse vertical plate 83 affixed to the respective frame member and providing a forwardly exposed engagement surface 84.

Figure 8:
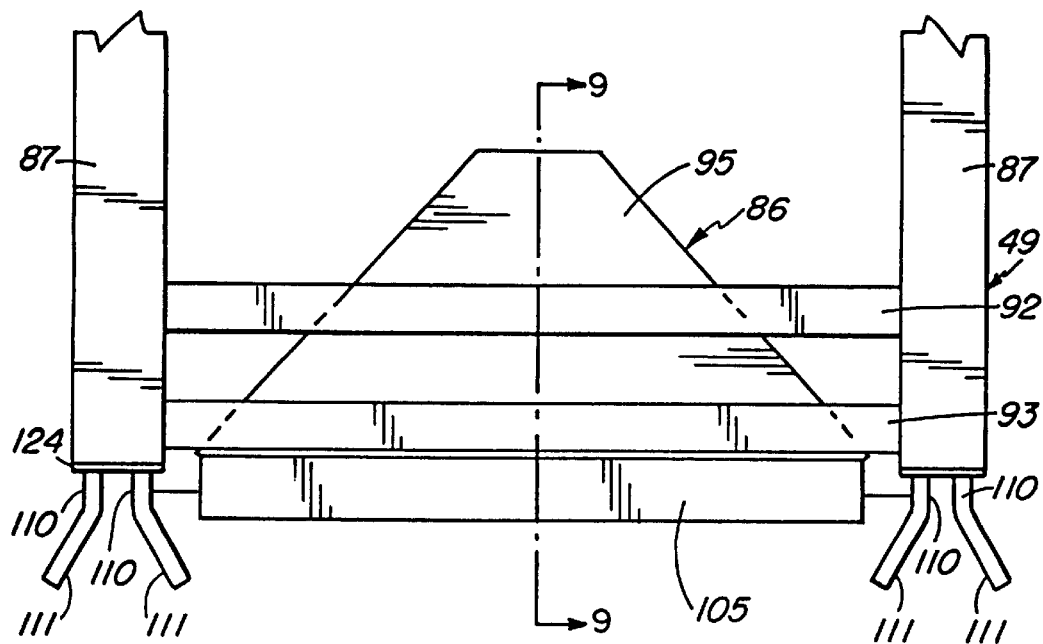
FIG. 8 is a plan view of the connector means shown in FIG. 7.
Figure 7:
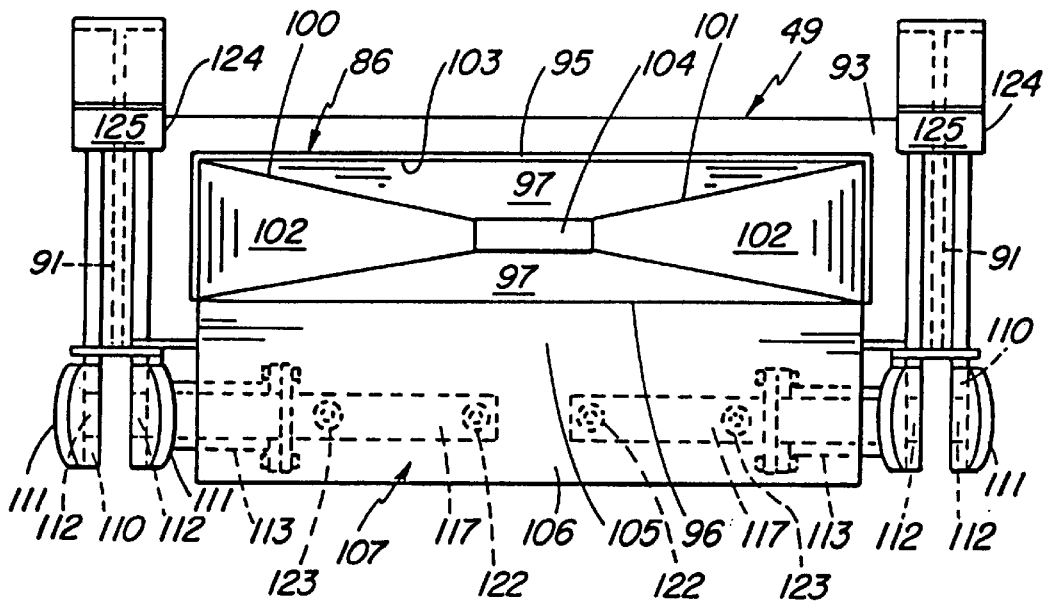
FIG. 7 is a rear view of the portion of the connector means of the present invention located at the rear of the first trailer and forming a part of the connector system of the present invention.
Figure 9:
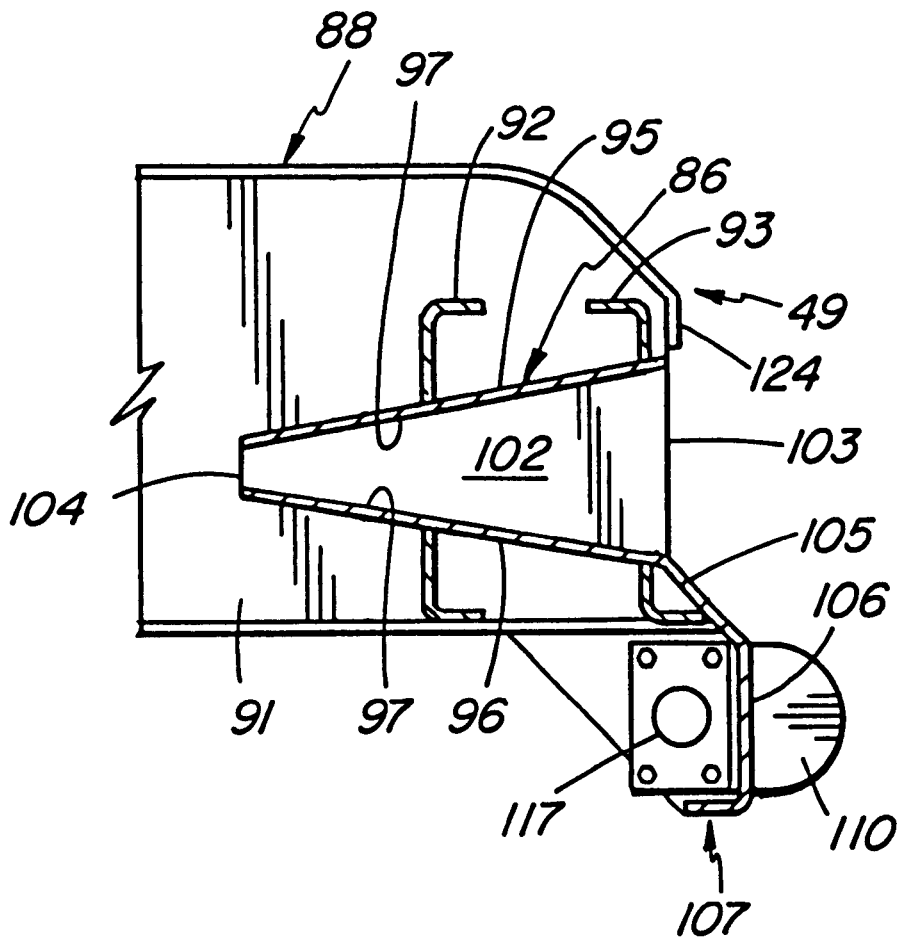
FIG. 9 is a cross section view of the connector means as seen from line 9—9 of FIG. 8.
Figure 12:
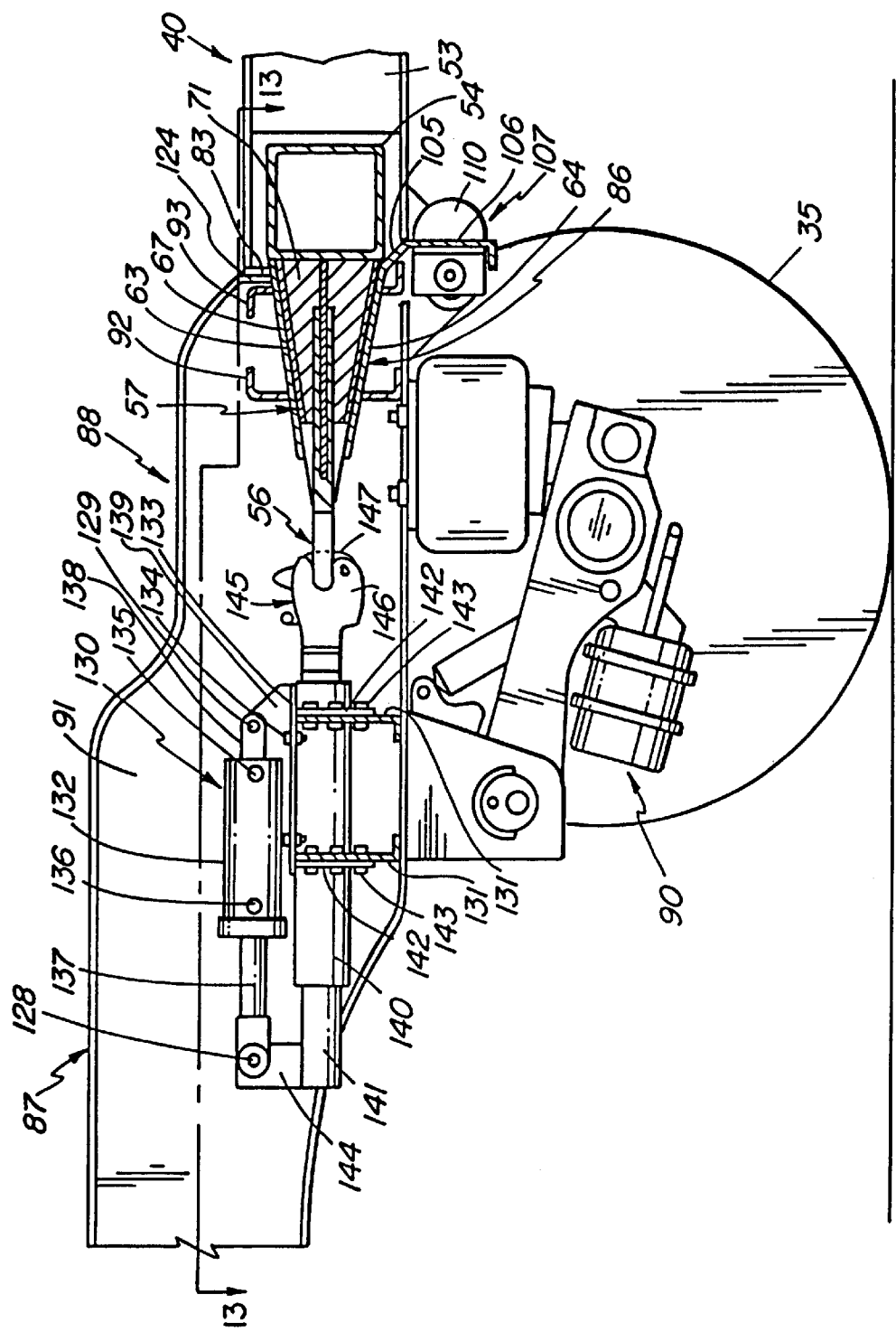
FIG. 12 is an enlarged cross-sectional elevational view as seen from the line 12—12 of FIG. 13 showing the connector portions of the suspension frame device and the first trailer in a hitched condition.
Figure 13:
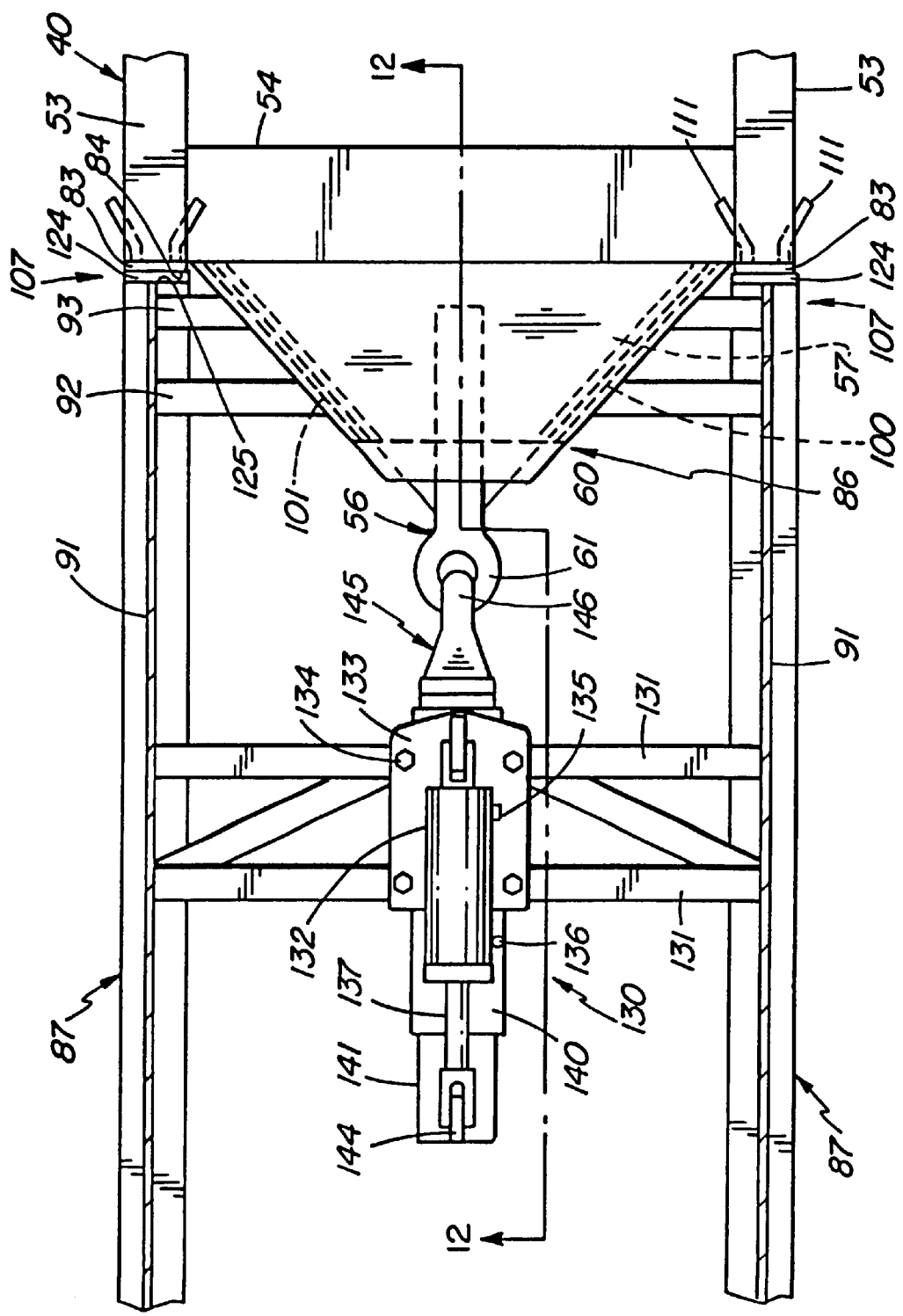
FIG. 13 is a cross-sectional view as seen from the line 13—13 of FIG. 12, again showing the connector system in a connected condition.

Turning now to the part 49 of the connector system 23 which is formed integrally with the rear part of the first trailer 20 as shown in more detail in FIGS. 7 to 9, it may be noted that it generally forms a cavity means or second guidance means 86 which is open from the rear of the trailer for receiving the first guidance means 57 projecting forwardly from the suspension frame device 22. The main frame 30 of the first transport trailer 20 includes a pair of longitudinal extending side beam members which are shown as being of I-shaped frame members 87,87 (FIG. 13). The I-shaped frame members 87,87 are shaped to provide an axle carrying rear portion 88 which is lower than the mid portions of these same members and are supported by the rear wheels 35 connected in the connectional manner by a suspension means generally shown at 90 (FIG. 12). The I-shaped members 87,87 provide central, vertical web portions 91 to which are attached transverse support members 92 and 93 to which the second guidance means 86 is secured.

The second guidance means 86 is formed by upper plate member 95 and lower plate member 96 which converge in the forward direction to provide interior converging surfaces 97,97, respectively shaped to conform substantially with the exterior contacting surfaces 77,77 of the forwarding projecting first guidance means 57 of the suspension frame device 22. The second guidance means 86 is further formed by side plate members 100,101 which are affixed at their upper and lower edges to side edges of the upper and lower plates 95,96. The side plate members 100,101 also converge in a forward direction so at to provide interior converging surfaces 102,102, shaped to correspond substantially to the contacting surfaces 76,76 of the wear plates 75,75 provided at the sides of the forwardly projecting first guidance means 57 of the suspension frame device 22. Thus, looking at the trailer 20 from the rear, the second guidance means 86 carried thereby forms a large rear opening 103 (FIG. 9) and a smaller front opening 104 with the interior cavity formed thereby tapering towards the front to provide interior walls shaped to correspond to the exterior shape of guidance means 56 carried by the suspension frame device 22. The second guidance means 86 is located at the rear of the first trailer to receive the guidance means 56 as trailer 20 and the suspension frame device 22 are moved together relative to each other. As the forwardly projecting first guidance means 56 enters the cavity formed by the second guidance means 86, the first connector means 56 projects forwardly through the front opening 104 of the second guidance means 86 before contact between the exterior surfaces of the first guidance means 57 is fully made with the interior surfaces of the second guidance means 86.

At the bottom of the rear opening 103, and continuous with the rear edge of lower plate member 96 is a further deflection plate 105 (FIG. 9) which slants rearwardly and downwardly at a sharper angle than plate member 96. This plate has a lower portion 106 which is substantially vertically disposed and shields a second lock means 107 located below the second guidance means 86 at the rearmost part of the frame members 87,87 of the first trailer, the second lock means 107 being integrally and permanently connected to frame members. The second lock means includes plate means in the form of a pair of parallel, vertically disposed plate members 110,110 at the rear of each frame member 87. The plate members of each pair are spaced in the transverse direction a distance only slightly greater than the transverse thickness of the lugs 81,81, and the two pairs of plate members 110,110 are disposed at a vertical height and are transversely spaced to receive one each of the lugs 81,81 as the suspension frame device 22 is pulled into a final hitching position as will be described in more detail below. Formed integrally with the two plate members 110,110, of each pair are secondary guide means in the form of rearwardly projecting ear portions 111,111, one each integrally formed with each of the plate members of the pair, the ear portions 111,111 flaring slightly outwardly in the rearward direction from the width of the space between the pair of plate members.

Figure 10:
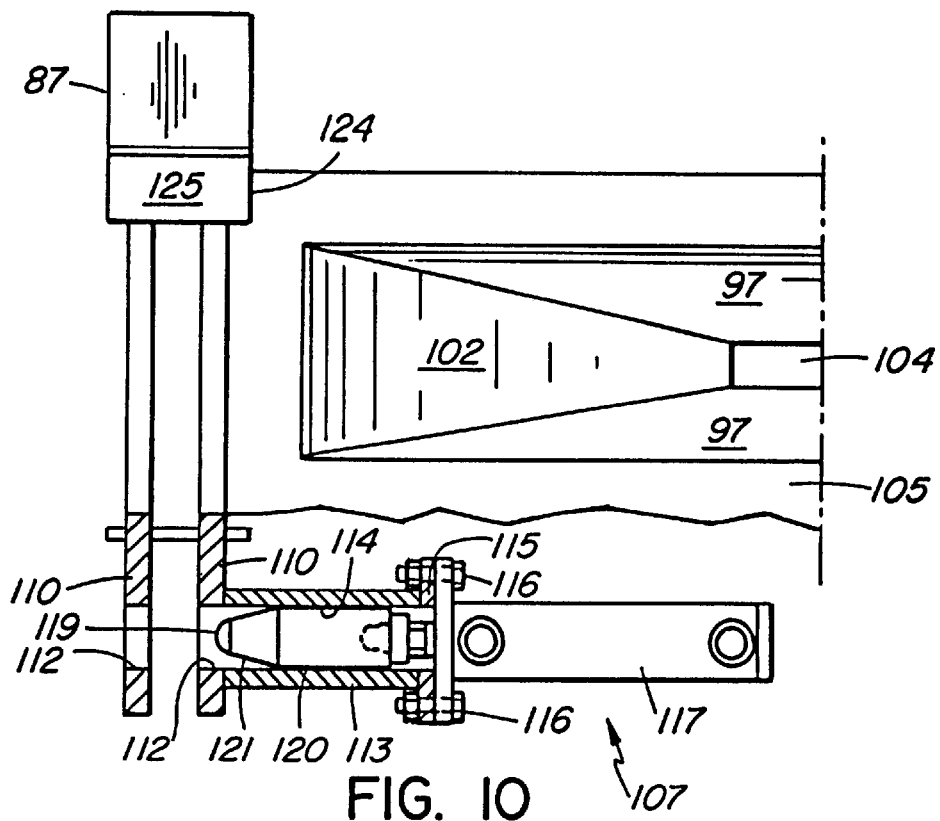
FIG. 10 is a view similar to FIG. 7, but it is enlarged and shows only the left half of the connector means from the rear and with a lower portion cut away to expose an interlocking means for securing the suspension frame device to the suspension frame of the transport trailer, the interlock means being in an unlocked position.
Figure 11:
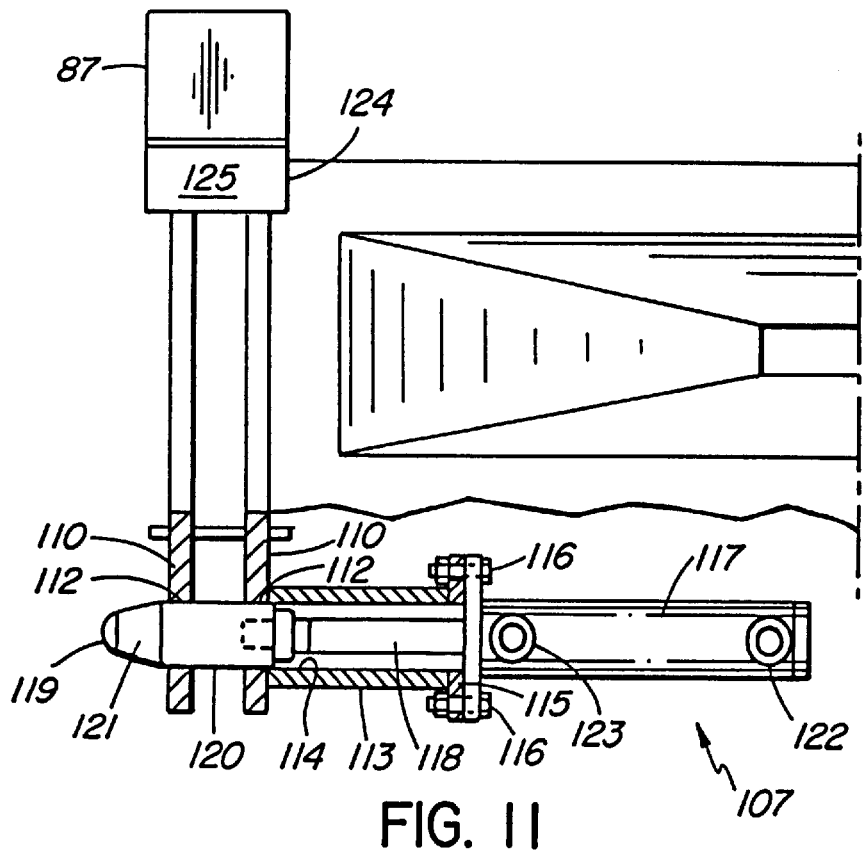
FIG. 11 is the same view as FIG. 10, but with interlock means in a locking position.

The plate members 110,110 in each pair have transversely aligned openings 112 therein of substantially the same diameter as the transverse openings 82 in the lugs 81. Affixed to the inside surface of the innermost of each plate member 110 of the pair is a mounting sleeve means in the form of a tube 113 coaxially disposed relative to the openings 112,112 of the associated pair of plate members. The mounting tube 113 has an internal bore 114 of substantially the same diameter as the openings 112,112. A flange 115 is integrally disposed at its innermost end of the mounting tube 113. Mounted to the flange 115 by way of bolts 116 is a double acting hydraulic cylinder 117 having a piston rod 118 extending from one end thereof and into the bore 114 of the mounting tube 113 (FIG. 11). Affixed to the outer end of the piston rod 118 is a bolt means in the form of a locking plunger 120 having an outside diameter only slightly less than aligned openings 112 of the plate members 110,110 and the transverse opening 82 in the lugs 81. The plunger 120 has a tapered intermediate portion 121 terminating in a rounded nose outer end portion 119. As will be described in more detail below when the hydraulic cylinder is activated by subjecting pressurized fluid to an inlet port 122 to drive the plunger to an activated working condition, it moves from the position shown in FIG. 10 to that shown in FIG. 11. When the port 122 is relieved of pressure and as port 123 is subjected to pressurized fluid, by hydraulic lines not shown, the plunger 120 is returned to its inactive or withdrawn position shown in FIG. 10. When the suspension frame device 22 is located in its final hitching position relative to the front trailer 20, the extension of the plunger to 120 to an activated or locking position as shown in FIG. 11 also causes the plunger 120 to pass through the opening 82 of the lug 80 at each side of the lock means to achieve interlock so as to attach the suspension frame device 22 to the front trailer 20.

Affixed to the rearmost end of each frame member 87 above the second lock means 107 is a transverse vertical plate 124 providing a rearwardly exposed engagement surface 125. As will be further described below, the surfaces 125 are located to be engaged with the forward exposed engagement surfaces 84,84 at the front of side frame members 53,53 of the suspension frame device 22 when the latter is brought to its final hitching position and the first lock means 80 and the second lock means 107 are interlocked.

Located between frame members 87,87 of the first trailer a short distance ahead of second guidance means 86 is a locating means 130 for moving the first connector means 56 from a preliminary hitching condition to its final hitching position (FIGS. 12 & 13). The locating means 130 is carried by a transverse support means in the form of opposed channel members 131,131 which are affixed at their opposite ends to the web portions 91,91 of the longitudinal extending frame members 87,87 of the first trailer 20. The locating means 130 includes an actuating means in the form of a double acting hydraulic cylinder 132 securely mounted on a horizontal plate 133. Affixed to the rear end of hydraulic cylinder 132 is a clevis member 138 which is fastened by a pin 129 to a vertical plate 139 extending in the longitudinal direction and affixed to horizontal plate 133. The plate 133 is affixed to top surfaces of the channel members 131,131, by way of bolts 134 which pass through aligned openings in the plate 133 and in upper flanges of the channel members 131,131. The hydraulic cylinder 132 has hydraulic ports 135 and 136 which are connected to hydraulic lines (not shown) running to a control valve (not shown) for alternatively supplying pressurized fluid to one of the ports 135,136 while relieving pressure from the opposite port in the conventional manner. The hydraulic cylinder 132 has a piston rod 137 extending from a forward end thereof and which is driven to an extended position as shown in FIGS. 12 and 13 when the port 135 is pressurized and to a retracted position (not shown) when port 136 is subjected to pressurized fluid.

Extending through openings in the vertical webs of the channel members 131,131 is a longitudinal sleeve 140 which is centrally disposed between the frame members of the front trailer 20 and has its longitudinal axis aligned with the central axis 62 of the second guidance means 86, this meaning the longitudinal axis of the sleeve 140 is also aligned with the center of the front opening 104 of the cavity within the second guidance means 86. A longitudinally shifting means in the form of a shaft 141 has a cross sectional shape coinciding with the internal cross sectional shape of the longitudinal opening through the sleeve. The shaft 141 has a rear end extending rearwardly of the sleeve 140 and a forward end extending forwardly of the forward end of the sleeve. The sleeve 140 has affixed thereto transverse flanges 142,142 which are fastened to webs of the channel members 131,131 by bolts 143 so as to prevent any movement of the sleeve 140 relative to the frame of the trailer 20 and thus relative to the second guidance means 86 which is also fixed relative to the frame of the trailer. An upwardly projecting lug 144 is formed integrally with the shaft 141, and the outer end of the piston rod 137 is fastened by a pin 128 to an upper end of the lug 144. Thus, as the hydraulic cylinder 132 is activated to extend the piston rod 137, the shaft 141 is pushed forwardly, as shown in FIGS. 12 and 13, and as the cylinder 132 is activated to retract the piston rod 137, the shaft 141 is shifted in a rearward direction in relation to the trailer 20.

There is shown attached to the rear end of the shaft 141 a grab hook 145 having a fixed jaw configuration 146 located in line with the center of the front opening 104 of the second guidance means 86. When the hydraulic cylinder 132 has been activated to retract the piston rod 137 so that the shaft 141 has been shifted to the rear, the fixed jaw 146 of the grab hook is positioned to receive the eye hook 61 as the first and second guidance means 57 and 86 interact due to relative movement between the first trailer 20 and the suspension frame device 22. The grab hook 145 is of the type having a moveable clamping jaw 147 which permits entry of the eye hook and automatically locks in a holding position due to the engagement of the eye hook. This type of grab hook, which is commercially available, includes an unlatching member (not shown) which is moveable from a locking position to an unlocking position to allow the clamping jaw to move to a releasing position when it is desired to disconnect the grab hook from the eye hook. In the present installation, it would be convenient to have a draw wire, not shown, attached to the unlatching member and extending to the side of the trailer where it would be readily available to the operator. When, during hitching, the relative movement between the suspension frame device and the front trailer has been sufficient to achieve a first hitching position, the draw bar 60 extends through the front opening 104 to a location to achieve engagement of the eye hook 61 within the fixed jaw of the grab hook 145 whereby the clamping jaw 147 of the grab hook is moved to a closed position relative to the fixed jaw so as to trap the eye hook 61 of the draw bar 60. Thus, when the actuator means is subsequently activated to thereby extend the piston rod 137, the shaft 141 is shifted forwardly. Thus, the first connector means 56 is pulled forward from its first or preliminary hitching position so that the first guidance means 57 is pulled fully into the second guidance means 86 which establishes a final hitching position of the connector means.

It is apparent that instead of providing the grab hook arrangement as described above, a simpler configuration could be utilized. The rear of the shaft 141 could be providing with a pair of horizontal lugs spaced vertically for reception of the eye hook 61 there between, the lugs having openings for alignment with the opening of the eye hook for reception of a drop pin which could be dropped in place by the operator.

In the use of the connector system 23 of the present invention, a trailer, such as trailer 20 described above, is constructed or modified at the rear to include the part of the connector system designated herein as number 49. When structurally attached to the tractor unit by way of the fifth wheel arrangement discussed above, the trailer is also connected to the hydraulic system of the tractor unit whereby on manual maneuvering of the control valves , which are located at a convenient location for the operator (not shown), the actuation of the hydraulic cylinder 117 of the lock means 107 and the actuation of the hydraulic cylinder 132 of the locating means 130, can be selectively carried out during the process of hitching the suspension frame device 22 to the rear of the first trailer 20, or during subsequent unhitching.

It may be desirable to have the suspension frame device 22 connected to the rear of the first trailer 20 for either of two primary reasons. If the load to be carried on the trailer 20 is such in relation to the acceptable load capacity for the rear wheels 35 or in relation to the expected road conditions, the attachment of the suspension frame device 22 is carried out so as to provide an effective frame in the form of an extended continuous beam which will distribute the weight of the load over the greater number of wheels provided by the suspension frame device 22. When used in this manner, and in the event the trailer 20 is in fact of the dump type or requiring rear gate unloading, the suspension frame device 22 will be detached at the end of the transport trip. The second reason for attaching the suspension frame device 22 would be to permit the tow of a second trailer, such as tailer 24, in tandem arrangement with first trailer 20, whereby the trailer 24 is towed through the suspension frame device 22. In this arrangement, the suspension frame device 22 supports the forward portion of the trailer 24 by its mounting on the fifth wheel 42 of the suspension frame device 22, and again, at the same time the suspension frame device does distribute the load at the rear of the first trail 20 through the continuous beam effect provided by the connector system 23. At the end of the haul, the second trailer 24 would be backed to an unload position by the tractor unit and through the first trailer 20, in the event the second trailer is of the dump type or of the rear gate unloading type. Once the unloading of the second trailer 24 is completed, it is pulled to a parking site where it is either disconnected from the fifth wheel in the conventional manner, or when the first trailer is to be unloaded by dumping, the second traer 24 may be left mounted on the suspension frame device 22 which is disconnected from the rear of the first trailer 20.

When connecting the suspension frame device 22 to the rear of trailer 22, the trailer 22 is backed towards the first of the suspension frame devices which may already have the second trailer 24 mounted on the fifth wheel 42. In the event only the suspension frame device 22 is being attached to the rear of the trailer 20, the suspension frame device might be pushed to the rear of the trailer 20. In constructing the two parts 48 and 49 of the connector system 23, the locating of the second guidance means 86 in the frame of the trailer 20, and the design of the suspension frame device 22 is selected so that the height of the center of the cavity formed by the second guidance means 86 and the height of the center line 62 of the first guidance means 57 substantially coincide. Thus on achieving substantially transversely alignment of the two connector means and selectively moving the rear of the trailer 20 toward the front of suspension frame device 22, the eye hook 61 first enters the rear opening 103 of the guidance means 86. As the guidance means 57,86 move further together due to the relative movement in the longitudinal direction of the trailer 20 and the frame suspension member 22, any misalignment either in the vertical or horizontal directions is compensated for and corrected upon engagement of the appropriate surface of the surfaces 77,77 and 97,97 in the vertical direction, or the appropriate surface 76,76 and 102,102 in the horizontal direction. As the insertion of the part 48 of the connector system reaches what is defined herein as a preliminary hitching position, wherein the eye hook extends well through the front opening 104 of the second guidance means 86, it is then so located to enter the fixed jaw 146 of the grab hook 145 causing closure of the clamping jaw 147 as previously described. At this stage the operator actuates the appropriate control valve to cause the forward shifting of the shaft 141 by the hydraulic cylinder 132, thus pulling the draw bar 60 forward establishing firm mating of the first guidance means 57 within the second guidance means 86. As the two parts 48,49 of the connector system undergo the final pull by the locating means 130 into the final hitching position, the lugs 81,81 forming the lock means 80 of the fame suspension device 22 enter the space between the plates 110,110 forming the lock means of the part 49 of the connector system carried at the rear of the trailer 20. During this entry, any slightly lateral misalignment between the lugs 81,81 and the spacing of the plates 110,110 is corrected by engagement of the lugs 81,81 with the rearwardly flared ears 111,111 at the rear of the plates 110,110. When the final hitching position is then reached, each of the openings 82,82 of the lugs 81,81 are in alignment with its respective set of openings 112,112 in the plates 110,110 between which each respective lug 81 has entered. Having reached this final hitching position the operator then actuates the appropriate control valve to provide pressurized fluid from the hydraulic system to the ports 122,122 of the hydraulic cylinders 117,117. Accordingly, the plungers 120, 120 ate driven out through the openings in 110,110 of their respective pairs of plates 110,110, thus passing through the openings 82,82 of the lugs 81,81 contained between such plates 110,110. Because of the presence of the rounded nose or outer end 119 followed by the tapered portion 121 of each plunger 120, any final minor misalignments between the positioning of the lugs 81,81 and the matching plates 110, 110 is eliminated as the plungers reach their final or extended positions as illustrated in FIG. 11. Having reached this final hitching condition, the forwardly exposed engagement surfaces 84,84 of the transverse vertical plates 83,83 affixed to the forward ends of side frame members 53,53 of the suspension frame device 22 are in tight engagement with the rearwardly exposed engagement surfaces 125,125 at the rear of the side frame members 87,87 of the front trailer 20.

It can be seen that as connected, the suspension frame device provides a rigid and safe connection, and in view of the form and relationship of the guidance means 57 and 86 in combination with the connector means 56, the hitching of the suspension frame device 22 to the first trailer 20 can be quickly and accurately carried out with a minimum of available assistance. At all times during the fully hitched condition, the frame suspension device 20 is not only held tightly in engagement by the interlocking of locking means 80 and 107, but the connection of the draw bar 60 and the locating means 130 remains in effect. In the final hitched condition, the suspension frame device 22 functions as an extension of the frame work of the first trailer. The projection of the plungers 120,120 through the aligned openings 112,112 of the plates 110,110 and the openings 82,82 of the lugs 81,81, accommodate in shear the tension moments of the thus formed continuous beam, while the tight engagement of the frame surfaces 84,84 at the front of the frame member 53,53 of the suspension frame device 2 with rear surfaces 125,125 of the frame members of the trailer 20 accommodate the compression bending moments of the continuous beam.

The release of the suspension fame device 22 from the rear of the front trailer 20 is a simple process in that it is only necessary for the operator to react the plungers 120,120 so as to effectively unlock the interlocked Iock means 80 and 107 by appropriately maneuvering the control valve to accomplish flow of pressurized fluid to ports 123 of hydraulic cylinders 117. Following this maneuver and with the brakes of the second trailer 24 released, the hydraulic cylinder 132 is then activated by way of the appropriate control so as to shift the shaft 141 rearwardly, whereby the draw bar 60 is forced a short distance rearwardly from its final hitching position so as to cause slight separation of the guidance means 57 and 86. This also pushes the second trailer rearwardly, after which its brakes are again applied. Appropriate action is then taken to release the clamping jaw of the grab hook 145 at which time the first trailer 20 can be drawn freely forward of the suspension front device 22.

While the above describes one preferred construction of the present invention, various modifications which do not depart from the spirit of the invention as defined in the appending claims will be apparent to those skilled in the art. As one example, while the above embodiment shows the male component of the interacting guide means being carried by the suspension frame device with the female component is mounted in the rear of the trailer, these components could be reversed. The shown arrangement is technically desirable in that the female component can be conventionally located without being vulnerably projecting from the rear of the trailer and also in that it does not hinder the dumping from a dumping trailer as shown in the present description. Also while the components forming the first lock means 80 and second lock means 107 could be reversed, and there is the option of having the locating means 130 mounted on the suspension frame device 22, it is believed preferable in most arrangements to have the components utilize hydraulic cylinders located on the front trailer instead of on the suspension frame device 22 because of the trailer having a more readily available source of pressurize fluid from the tractor unit prior to the suspension frame device being connected to the trailer.

Moreover, as other examples of obvious modifications, while the invention has been described as having actuators in the form of hydraulic cylinders actuated through appropriate control valves in a hydraulic system, it would be obvious for the system to be one using other fluid systems, such as air, which is in common use in tractor trailer rigs. Alternatively, linear actuators in the form of electromagnetic means controlled by electric switches could be practicably used in place of hydraulic units shown as at 117,117 and 135 in the above embodiment. As indicated, these and other alternatives may be selected in certain circumstances without departing from the present invention.

What I claim is:

1. A connector system for coupling a suspension frame device to a rear part of a suspension frame of a transport trailer having longitudinally extending frame members, said suspension frame device including a rigid main frame portion and wheel means for supporting said frame portion for road travel in combination with said suspension frame of said transport trailer, said connector system comprising;
    a forwardly located first connector attached to said suspension frame device,
    a second connector carried by said rear part of said suspension frame of said transport trailer,
    said first connector including first lock means carried by said frame portion of said suspension frame device for forming an interlock,
    said second connector including second lock means carried by said frame members of said suspension frame of said transport trailer and positioned for forming an interlock with said first lock means as said first and second connectors are moved to a final hitching position relative to each other,
    a locator affixed to one of said first and said second connectors and including actuator means for pulling the other of said first and second connectors from a preliminary hitching condition to locate said first connector in said final hitching position relative to said second connector,
    said first and second lock means including selectively actuable means for engaging and disengaging said interlock of said first and second lock means for preventing longitudinal departure of said frame portion of said suspension frame device from said rear part of said suspension frame of said transport trailer when said interlock is engaged,
    said first connector further including forwardly exposed engagement surface means located above said first lock means,
    said second connector further including rearwardly exposed engagement surface means located above said second lock means for contacting said forwardly exposed engagement surface means of said first connector upon said interlock being formed,
    whereby said frame portion of said suspension frame device and said suspension frame of said transport trailer when interlocked function as a continuous suspension beam in that compression bending moments are transferred through engagement of said rearwardly and forwardly exposed engagement surface means and tension bending moments are transferred through said interlock of said first and second lock means.

2. A connector system as defined in claim 1, wherein said first connector includes a first guidance means fastened to said suspension frame device for interacting with a second guidance means, and said second connector includes a second guidance means affixed to said rear part of said suspension frame of said transport trailer for interacting with said first guidance means of said suspension frame device during movement of said transport trailer relative to said suspension frame device towards said final hitching position, said first and second guidance means interacting to initially position said first and second connectors in said preliminary hitching condition.

3. A connector system as defined in claim 2, wherein said first guidance means includes a projection means affixed to said main rigid frame portion of said suspension frame device and defined by a first plurality of walls converging in a forwardly direction, and wherein,
    said second guidance means is defined by a second plurality of walls affixed to said frame members of said transport trailer and having a rearwardly open cavity for mating reception of said projecting means,
    said plurality of walls of said projection means being provided with outer contact surfaces in the form of a frustum having a central axis extending in a longitudinal direction of said suspension frame device and a base portion thereof attached to a forward face of said suspension frame device.

4. A connector system as defined in claim 3, wherein said plurality of walls of said projection means includes:

opposed side walls defining converging outside contacting surfaces, and top and bottom walls defining converging upper and lower outside contacting surfaces, whereby said outside contacting surfaces of projection means form a forwardly inwardly tapered guidance means of frusto pyramidal shape.

5. A connector system as defined in claim 3, wherein said plurality of walls of said second guidance means includes opposed side walls defining converging inside side contacting surfaces and top and bottom walls defining converging inside upper and lower contacting surfaces, said converging inside side contacting surfaces and said converging inside upper and lower contacting surfaces defining a cavity substantially conforming in shape to said frusto pyramidal shape of said projection means, whereby said outside surfaces of said projection means and inside surfaces of said cavity are in full engagement upon said first and second guidance means reaching said final hitching position.

6. A connector system as defined in claim 3, wherein said plurality of walls defining said cavity of said second guidance means provides forwardly tapered internal wall surfaces of a shape for close mating reception of said frustum formed by said walls of said projection means, said plurality of walls of said second guidance means extending forward from a rear opening thereof to a forward opening of a smaller cross section than said rear opening, and wherein said locator includes a draw bar having connection means at a forward end and being affixed at a rear end to said suspension frame device, said forward end of said draw bar projecting forwardly of said frustum a distance sufficient to extend through said forward opening of said plurality of walls of said second guidance means in said preliminary hitching condition, and wherein said actuator means of said locator includes a shifting means affixed to said suspension frame of said transport trailer and having means for attachment to said connection means of said draw bar to thereby pull said draw bar forward to establish said final hitching position.

7. A connector system for coupling a suspension frame device to a rear part of a suspension frame of a transport trailer having longitudinally extending frame members, said suspension frame device including a rigid main frame portion and wheel means for supporting said frame portion for road travel in combination with said suspension frame of said transport trailer, said connector system comprising:

a forwardly located first connector attached to said suspension frame device, a second connector carried by said rear part of said suspension frame of said transport trailer, said first connector including first lock means carried by said frame portion of said suspension frame device for forming an interlock, said second connector including second lock means carried by said frame members of said suspension frame of said transport trailer and positioned for forming an interlock with said first lock means as said first and second connectors are moved to a final hitching position relative to each other, said first and second lock means including selectively actuable means for engaging and disengaging said interlock of said first and second lock means for preventing longitudinal departure of said frame portion of said suspension frame device from said rear part of said suspension frame of said transport trailer, said first connector including a first guidance means fastened to said suspension frame device for interacting with a second guidance means, said second connector including a second guidance means affixed to said rear part of said suspension frame of said transport trailer for interacting with said first guidance means of said suspension frame device during movement of said transport trailer relative to said suspension frame device towards said final hitching position, said first and second guidance means interacting to initially position said first and second connectors in a preliminary hitching condition, said first guidance means including a projection means affixed to said main rigid frame portion of said suspension frame device and providing wall means converging in a forwardly direction, said second guidance means including wall means affixed to said frame members of said transport trailer and having a rearwardly open cavity for mating reception of said projecting means, said wall means of said projection means being provided with an outer contact surface in the form of a frustum having a central axis extending in a longitudinal direction of said suspension frame device and a base portion thereof attached to a forward face of said suspension frame device said wall means of said cavity of said second guidance means providing a forwardly tapered internal contact surface of a shape for close mating reception of said frustum formed by said wall means of said projection means, said wall means of said second guidance means extending forward from a rear opening thereof to a forward opening of a smaller cross section than said rear opening a locator affixed to one of said first and second connectors and including actuator means for pulling the other of said first and second connectors from said preliminary hitching condition to locate said first connector in said final hitching position relative to said second connector so that said first and second lock means are actuable to achieve said interlock of said first and second lock means;

said locator including a draw bar having connection means at a forward end and being affixed at a rear end to said suspension frame device, said forward end of said draw bar projecting forwardly of said frustum a distance sufficient to extend through said forward opening of said wall means of said second guidance means in said preliminary hitching condition, said actuator means of said locator including a shifting means affixed to said suspension frame of said transport trailer and having means for attachment to said connection means of said draw bar to thereby pull said draw bar forward to establish said final hitching position, said shifting means of said locator including a shaft means mounted for reciprocation in the longitudinal direction from a rearward connecting position to a forward retracted position, said shaft means being substantially aligned with a longitudinal axis of said draw bar in said preliminary hitching position, said connection means at said forward end of said draw bar including an eye-hook, said means for attachment of said shifting means to said connection means of said draw bar including means for mating connection with said eye-hook in said preliminary hitching condition said first connector further including forwardly exposed engagement surface means located above said first lock means, said second connector further including rearwardly exposed engagement surface means located above said second lock means for contacting said forwardly exposed engagement surface means of said first connector upon said interlock, whereby said frame portion of said suspension frame device and said suspension frame of said transport trailer when interlocked function as a continuous suspension beam means in that compression bending moments are transferred through engagement of said rearwardly and forwardly exposed engagement surface means and tension bending moments are transferred through said interlock of said first and second lock means.

8. A connector system for coupling a suspension frame device to a rear part of a suspension frame of a transport trailer having longitudinally extending frame members, said suspension frame device including a rigid main frame portion and wheel means for supporting said frame portion for road travel in combination with said suspension frame of said transport trailer, said connector system comprising:

a forwardly located first connector attached to said suspension frame device, a second connector carried by said rear part of said suspension frame of said transport trailer, said first connector including first lock means carried by said frame portion of said suspension frame device for forming an interlock, said second connector including second lock means carried by said frame members of said suspension frame of said transport trailer and positioned for forming an interlock with said first lock means as said first and second connectors are moved to a final hitching position relative to each other, said first connector including a first guidance means fastened to said suspension frame device for interacting with a second guidance means, said second connector including a second guidance means affixed to said rear part of said suspension frame of said transport trailer for interacting with said first guidance means of said suspension frame device during movement of said transport trailer relative to said suspension frame device towards said final hitching position, said first and second guidance means interacting to initially position said first and second connectors in a preliminary hitching condition, said first and second lock means including selectively actuable means for engaging and disengaging said interlock of said first and second lock means for preventing longitudinal departure of said frame portion of said suspension frame device from said rear part of said suspension frame of said transport trailer, a locator affixed to one of said first and second connectors and including actuator means for pulling the other of said first connector and second connectors from said preliminary hitching condition to locate said first connector in said final hitching position relative to said second connector so that said first and second lock means are actuable to achieve said interlock of said first and second lock means;

said first lock means including forwardly extending lug means affixed to said rigid main frame portion of said suspension frame device below said first guidance means and having a transverse opening therethrough, said second lock means including;

a pair of rearwardly disposed plate means affixed to said suspension frame of said transport trailer below said second guidance means, said plate means being positioned to receive said lug means during movement of said suspension frame device to its final hitching position, said plate means having openings therein for alignment with said transverse opening in said lug means, and bolt means mounted for transverse movement through said openings in said plate means and said opening in said lug means to achieve said interlock of said first and second lock means said first connector further including forwardly exposed engagement surface means located above said first lock means, said second connector further including rearwardly exposed engagement surface means located above said second lock means for contacting with said forwardly exposed engagement surface means of said first connector upon said interlock, whereby said frame portion of said suspension frame device and said suspension frame of said transport trailer when interlocked function as a continuous suspension beam means in that compression bending moments are transferred through engagement of said rearwardly and forwardly exposed engagement surface means and tension bending moments are transferred through said interlock of said first and second lock means.

9. A connector system as defined in claim 8, wherein said lug means includes a pair of lugs spaced laterally on either side of a longitudinal axis of said frame portion of said suspension frame device, and said plate means includes two sets of parallel spaced vertical plate members, each set being attached to a rear portion of said longitudinally extending frame members of said suspension frame of said transport trailer and having aligned transverse openings therethrough, each set of the two sets of parallel vertical plate members being spaced and disposed for reception of one each of said lugs therebetween.

10. A connector system as defined in claim 9, wherein said bolt means includes;

a mounting sleeve means affixed to said suspension frame of said transport trailer and having an internal bore aligned with said aligned openings of said pair of plates, and a plunger reciprocally mounted in said bore of said mounting sleeve means and having an outer end sized for snug reception in the aligned openings of said lugs and pairs of plate members when said suspension frame device is moved to said final hitching position.

11. A connector system as defined in claim 10, wherein said sleeve means includes a pair of tube members one each associated with one of said pair of plate members, said bolt means includes a pair of said plungers, one each being mounted within each of said tube members and being movably laterally outward to a sealed position within said aligned opening to achieve interlock.

12. A connector system as defined in claim 11, and further including
linear, double acting motor means actuable for forcing said plungers laterally outward for achieving interlock between said first and second locking means, and forcing said plungers inwardly to disconnect said interlock.

13. A connector system as defined in claim 9, wherein
each pair of parallel vertical plates includes rearwardly projecting outwardly flared ear portions integrally affixed thereto and forming therebetween a guide means for directing each lug entry accurately between the pair of plates of its respective mating set.

14. A connector system for coupling a suspension frame device to a rear part of a suspension frame of a transport trailer having longitudinally extending side frame members, said suspension frame device including a main rigid frame portion and wheel means for supporting said frame portion for road travel, said connector system comprising:
a forwardly located first connector rigidly attached to said frame portion of said suspension frame device,
a first guidance means fastened to said suspension frame device for interacting with a second guidance means, and associated with said first connector
a second connector carried by said frame members of said transport trailer
a second guidance means associated with and fastened to said rear part of said suspension frame of said transport trailer for interacting with said first guidance means of said suspension frame device during movement of said transport trailer relative to said suspension frame device towards a hitching position of said first and second connectors
said first and second guidance means interacting to position said first and second connectors in a preliminary hitching condition,
a locator affixed to one of said first connector and said second connector and including actuator means for pulling the other of said first connector and said second connector from the preliminary hitching condition to locate said first connector in a final hitching position relative to said second connector,
first lock means carried by said frame portion of said suspension frame device, and
second lock means carried by said frame members of said transport trailer and positioned for forming an interlock with said first lock means as said first connector is moved to said final hitching position,
whereby said frame portion of said suspension frame device is rigidly connected to said frame members of the transport trailer by said interlocking of said first and second lock means.

15. A connector system as defined in claim 14, wherein
said first guidance means includes a projection means affixed to said main rigid frame portion of said suspension frame device and including wall means converging in a forwardly direction towards a central axis of said projection means, and wherein,
said second guidance means includes wall means affixed to said frame members of said transport trailer and having a rearwardly open cavity for mating reception of said projecting means.

16. A connector system as defined in claim 15, wherein said wall means of said projection means has an outer contact surface in the form of a frustum having a central axis extending in a longitudinal direction of said suspension frame device and a base portion thereof attached to a forward face of said suspension frame device.

17. A connector system as defined in claim 16, wherein said wall means of said projection means includes:
opposed side walls defining converging outside contacting surfaces, and
top and bottom walls defining converging upper and lower outside contacting surfaces,
whereby said outside contacting surfaces of projection means form a forwardly inwardly tapered guidance means of frusto pyramidal shape.

18. A connector system as defined in claim 16, wherein
said wall means of said second guidance means includes opposed side walls defining converging inside side contacting surfaces and top and bottom walls defining converging inside upper and lower contacting surfaces,
said converging inside side contacting surfaces and said converging inside upper and lower contacting surfaces defining a cavity substantially conforming in shape to said frusto pyramidal shape of said projection means,
whereby said outside surfaces of projection means and inside surfaces of said cavity are in full engagement upon said first and second guidance means reaching said final hitching position.

19. A connector system as defined in claim 16, wherein
said wall means of said cavity of said second guidance means provides forwardly tapered internal wall surfaces of a shape for close mating reception of said frustum formed by said walls of said projection means, said wall means of said second guidance means extending forward from a rear opening thereof to a forward opening of a smaller cross section than said rear opening.

20. A connector system as defined in claim 19 and wherein:
said locator includes a draw bar having a connector at a forward end and being affixed to said suspension frame device,
said forward end projecting forwardly of said frustum a distance sufficient to extend through said forward opening of said wall means of said second guidance means in said preliminary hitching condition, and
wherein said actuator means of said locator includes a shifting means affixed to said suspension frame of said transport trailer and having means for attachment to said connector of said draw bar and for drawing of said draw bar forward to establish said final hitching position.

21. A connector system for coupling a suspension frame device to a rear part of a suspension frame of a transport trailer having longitudinally extending side frame members, said suspension frame device including a main rigid frame portion and wheel means for supporting said frame portion for road travel, said connector system comprising:
a forwardly located first connector rigidly attached to said frame portion of said suspension frame device,
a first guidance means fastened to said suspension frame device for interacting with a second guidance means and associated with said first connector,
a second connector carried by said frame members of said transport trailer a second guidance means associated with and fastened to said rear part of said suspension frame of said transport trailer for interacting with said first guidance means of said suspension frame device during movement of said transport trailer relative to said suspension frame device towards a hitching position of said first and second connectors, said first and second guidance means interacting to position said first and second connectors in a preliminary hitching condition, said first guidance means including a projection means affixed to said main rigid frame portion of said suspension frame device and defined by a first plurality of walls converging in a forwardly direction towards a central axis of said projection means, said second guidance means is defined by a second plurality of walls affixed to said frame members of said transport trailer and having a rearwardly open cavity for mating reception of said projecting means, said plurality of walls of said projection means having outer contact surfaces in the form of a frustum having a central axis extending in a longitudinal direction of said suspension frame device and a base portion thereof attached to a forward face of suspension frame device, said plurality of walls defining said cavity of said second guidance means providing forwardly tapered internal wall surfaces of a shape for close mating reception of said frustum formed by said walls of said projection means, said plurality of walls of said second guidance means extending forward from a rear opening thereof to a forward opening of a smaller cross section than said rear opening, a locator affixed to one of said first and second connectors and including actuator means for pulling the other of said first connector and said second connector from the preliminary hitching condition to locate said first connector in a final hitching position relative to said second connector, said locator including a draw bar having connection means at a forward end and being affixed to said suspension frame device and projecting forwardly of said frustum a distance sufficient to extend through said forward opening of said wall means of said second guidance means in said preliminary hitching condition, said actuator means of said locator including a shifting means affixed to said suspension frame of said transport trailer and having means for attachment to said connection means of said draw bar and drawing of said draw bar forward to establish said final hitching position, said shifting means of said locator including a shaft mounted for reciprocation in the longitudinal direction from a rearward connecting position to a forward retracted position substantially aligned with a longitudinal axis of said draw bar in said preliminary hitching position, said connection means at a forward end of said draw bar including an eye-hook, said means for attachment of said forward shifting means to said connection means of said draw bar for forming a mating connection with said eye-hook in said preliminary hitching condition, first lock means carried by said frame portion of said suspension frame device for forming an interlock, and second lock means carried by said frame members of said transport trailer and positioned for forming an interlock with said first lock means as said first connector is moved to said final hitching position in which said frame portion of said suspension frame device is rigidly connected to said frame members of the transport trailer by said interlocking of said first and second lock means.

22. A connector system as defined in claim 20 wherein:

said means of attachment of said forward shifting means to said connection means of said draw bar includes a grab hook provided with a moveable jaw for reception in said eye-hook on entry of said eye-hook into said grab hook when said shaft means is in said rearward connection position and said draw bar moves to the preliminary hitching condition.

23. A connector system as defined in claim 21, wherein:

said actuator means further includes a hydraulic cylinder connected to said shaft for movement of said shaft from said rearward connecting position to said forward retracted position to thereby pull said draw bar relative to said transport trailer from said preliminary hitching condition to said final hitching position and for alternatively pushing said draw bar relative to said transport trailer from said forward retracted position to said rearward connection position to thereby return said draw bar to a disconnecting position corresponding to said preliminary hitching condition.

24. A connector system for coupling a suspension frame device to a rear part of a suspension frame of a transport trailer having longitudinally extending side frame members, said suspension frame device including a main rigid frame portion and wheel means for supporting said frame portion for road travel, said connector system comprising:

a forwardly located first connector rigidly attached to said frame portion of said suspension frame device, a first guidance means fastened to said suspension frame device for interacting with a second guide means and associated with said first connector, a second connector carried by said frame members of said transport trailer, a second guidance means associated with and fastened to said rear part of said suspension frame of said transport trailer for interacting with said first guidance means of said suspension frame device during movement of said transport trailer relative to said suspension frame device towards a hitching position of said first and second connectors, said first and second guidance means interacting to position said first and second connectors in a preliminary hitching condition, a locator affixed to one of said first and said second connectors and including actuator means for pulling the other of said first and said second connectors from the preliminary hitching condition to locate said first connector in a final hitching position relative to said second connector, first lock means carried by said frame portion of said suspension frame device, second lock means carried by said frame members of said transport trailer and positioned for forming an interlock with said first lock means as said first connector is moved to said final hitching position, whereby said frame portion of said suspension frame device is rigidly connected to said frame members of the transport trailer by said interlocking of said first and second lock means said first lock means including forwardly extending lug means affixed to said rigid main frame portion of said suspension frame device below said first guidance means and having a transverse opening therethrough, said second lock means including:
- a rearwardly disposed plate means affixed to said suspension frame of said transport trailer below said second guidance means,
- said plate means being positioned to receive said lug means during movement of said suspension frame device to its final hitching position,
- said plate means having openings therein for alignment with said transverse opening in said lug means, and
- bolt means mounted for transverse movement through said openings in said plate means and said opening in said lug means to achieve said interlock of said first and second lock means, whereby said frame portion of said suspension frame device is rigidly connected to said frame members of the transport trailer by said interlocking of said first and second lock means.

25. A connector system as defined in claim 24, wherein said lug means includes a pair of lugs spaced laterally on either side of a longitudinal axis of said frame portion of said suspension frame device, and said plate means includes two sets of pairs of parallel spaced vertical plate members, each set being attached to a rear portion of said longitudinally extending frame members of said suspension frame of said transport trailer and having aligned transverse openings therethrough, each set of the pair of parallel vertical plate members being spaced and disposed for reception of one each of said lugs therebetween.

* * * * *

UNITED STATES PATENT AND TRADEMARK OFFICE
CERTIFICATE OF CORRECTION

PATENT NO. : 6,318,746 B1
DATED : November 20, 2001
INVENTOR(S) : Kevin R. McCrory It is certified that error appears in the above-identified patent and that said Letters Patent is hereby corrected as shown below:

Column 13,
Line 5, insert -- said -- before "projection"

Column 14,
Line 29, "device" should read as -- device, --
Line 38, "opening" should read as -- opening, --

Column 15,
Line 6, "condition" should read as -- condition, --

Column 16,
Line 22, "means" should read as -- means, --

Column 17,
Line 28, "connector" should read -- connector, --
Line 30, "trailer" should read as -- trailer, --
Line 37, "connectors" should read as -- connectors, --

Column 18,
Line 13, insert -- said -- before "projection"
Line 26, insert -- said -- before "projection"
Line 67, "trailer" should read as -- trailer, --

Column 20,
Line 9, "claim 20" should read as -- claim 21 --

UNITED STATES PATENT AND TRADEMARK OFFICE
CERTIFICATE OF CORRECTION

PATENT NO. : 6,318,746 B1
DATED : November 20, 2001
INVENTOR(S) : Kevin R. McCrory It is certified that error appears in the above-identified patent and that said Letters Patent is hereby corrected as shown below:

<u>Column 21,</u>
Line 2, "means" should read as -- means, --

Signed and Sealed this

Third Day of September, 2002

*Attest:*

*Attesting Officer*

JAMES E. ROGAN
*Director of the United States Patent and Trademark Office*